350-266

SEARCH ROOM

July 8, 1952 A. V. BEDFORD 2,602,854

COLOR TELEVISION

Filed Oct. 25, 1947 3 Sheets-Sheet 1

INVENTOR
Alda V. Bedford
BY Ane. J. Mitchell
ATTORNEY

July 8, 1952 A. V. BEDFORD 2,602,854

COLOR TELEVISION

Filed Oct. 25, 1947 3 Sheets-Sheet 2

INVENTOR
Alda V. Bedford
BY [signature]
ATTORNEY

SEARCH ROOM

July 8, 1952 A. V. BEDFORD 2,602,854

COLOR TELEVISION

Filed Oct. 25, 1947 3 Sheets-Sheet 3

INVENTOR
Alda V. Bedford
BY Paul L. Mitchell
ATTORNEY

SEARCH ROOM

Patented July 8, 1952 2,602,854

UNITED STATES PATENT OFFICE 2,602,854

COLOR TELEVISION

Alda V. Bedford, Princeton, N. J., assignor to Radio Corporation of America, a corporation of Delaware Application October 25, 1947, Serial No. 782,104

13 Claims. (Cl. 178—5.4)

This invention relates to the sequential type color television systems and more particularly to light filter arrangements.

The invention will be illustrated for tricolor television, but it is equally adapted to bicolor, quadricolor, tricolor plus neutral-color key plate, or any other similar form of multicolor additive television. In such systems, there are transmitted and received a series of substantially black and white component color images which, by their lights and shades, carry the color separation of the original scene to the receiver and enable its reproduction by their sequential presentation to the viewer behind their appropriate color filters.

So-called rotating disk type color filter systems have heretofore been used to some extent as the color filter arrangement. One disadvantage of such disk filters is their size. It must be at least twice the appropriate image dimension. If there is to be any attempt to have the filter action follow in some measure the passage of the scanning line across or down the image area, complications in design and construction frequently arise. Appreciable variations in the intensity of the color of one or more of the filter sections or at least in some part thereof cause untrue color rendition. The windage, requisite driving power and resulting noise of disk filters is undesirable. The large actual size of such filters may make it impracticable to use them in certain image projection systems, inasmuch as the loss of light caused by interposition of the filter disk casing and the motor driving equipment may become excessive.

There has been proposed for the purpose of overcoming the aforementioned difficulties and inconvenience a filter arrangement employing a multiple element filter member in conjunction with a mask and so arranged that a slight movement of the mask with respect to the filter member results in the transmission of different of the selected component colors to provide for a rapid succession of differently colored images without extensive mechanical motion. Such an arrangement is shown and described in the United States patent to George C. Sziklai, No. 2,457,415, issued December 28, 1948.

The present invention relates to improvements in this type of filter arrangement and wherein the association of the filter elements and the mask move relative to each other in a complex oscillatory type of motion without fast acceleration at the instant of changing color field which produces a sequential change in color representation to follow an associated scanning operation.

A primary object of this invention is to provide an improved color television system.

Another object of this invention is to provide for producing color separation images sequentially with simple and compact mechanical devices.

Still another object of this invention is to mechanically change color filters in connection with the associated scanning process without requiring high accelerations.

Other and incidental objects of the invention will be apparent to those skilled in the art from a reading of the following specification and an inspection of the accompanying drawing in which Figure 1 illustrates with an isometric drawing one form of this invention, together with its associated mechanical drive mechanism;

Figure 1:
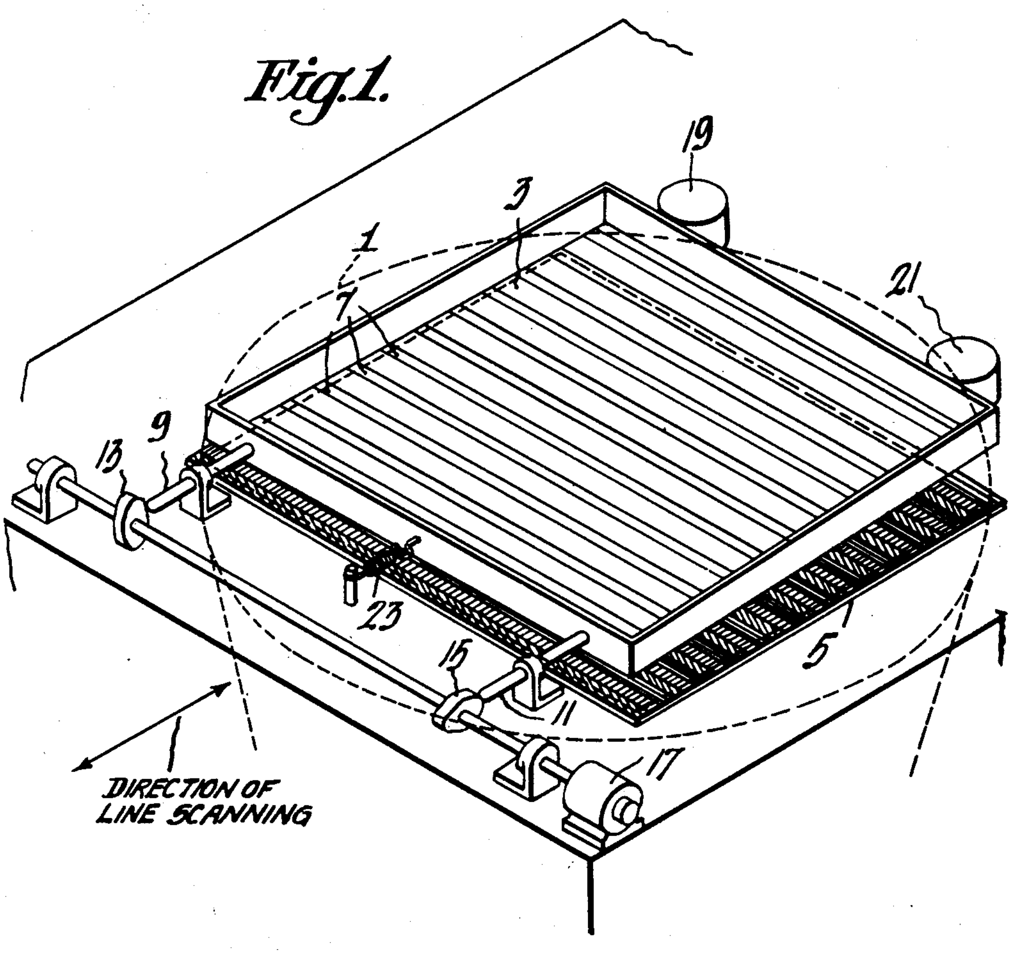

Turning now in more detail to Figure 1, there is shown an electron beam scanning tube 1, which takes in this form of the invention an image reproducing tube such as, for example, the popular kinescope.

Tube 1 may also take the form of a transmitting tube of the popular image orthicon, the orthicon or the iconoscope where the present invention is applied to a television transmitter camera.

The direction of line scanning is indicated by the arrow to the left of the figure.

A mask 3 is mounted moveably with respect to the associated color filter 5. The mask 3 and color filter 5 should be mounted close to each other and may, for example, be touching each other or be separated by a film of lubricant. In the form of the invention shown, mask 3 is moveable and color filter 5 is fixed. In another form of this invention, the mask 3 may be fixed and the filter element 5 may be moveable. In still another form of this invention, both mask 3 and filter 5 may be moveable, the relative motion being the same for the several forms. The operation of this invention will be explained in connection with the form illustrated in Figure 1, wherein the filter 5 is fixed and the mask 3 is moveable.

Filter 5 consists of a plurality of extremely narrow strips of different selected component color filter elements arranged sequentially in groups. In the form of the invention illustrated adaptable for tricolor television, the filter elements are red, blue and green. Although in practice they are small enough to be indistinguishable by the unaided human eye at the optimum picture viewing distance, for the purpose of illustration they have been enlarged.

The mask 3 consists of a grating having transparent sections 7 which substantially correspond in size, shape and spacing with any one color of the selected component color filter elements in the filter 5.

At one edge of the mask 3 there is attached a pair of driving pins 9 and 11 which are arranged to butt up against rotating cams 13 and 15, which are driven synchronously by motor 17. A pair of rubber grommets 19 and 21 are positioned to support the mask 3. A spring 23 is employed to maintain contact between pins 9 and 11 and their associated cams 13 and 15.

It will be seen that the orientation of cam 13 is different from the orientation of cam 15. It will be seen that the rotation of cams 13 and 15 will give the mask 3 a complex oscillatory motion so that the transparent sections 7 of the mask 3 are not always parallel with the elements of the filter 5 during the motion of the mask 3. The transparent section 7 will, however, overlap each of the associated elements of filter 5 at one position of the scanning line at all times. This operation may best be explained by reference to the additional figures.

Figure 2:
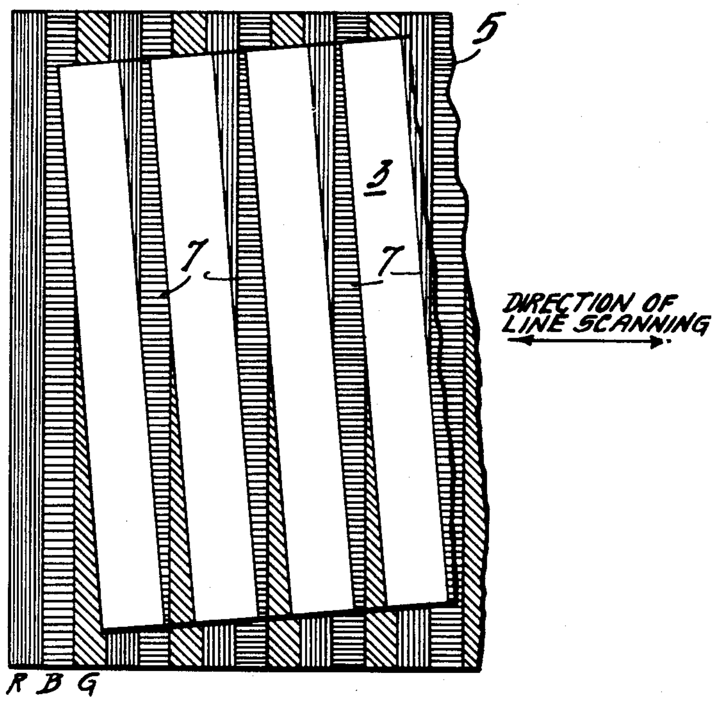
Figure 2 shows in detail a greatly enlarged portion of the ruled color filter and its associated mask.

Turning now to Figure 2, there is shown an enlarged section of the mask 3 with its transparent sections 7 overlapping the several different color elements of filter 5.

In the several illustrations making up the drawing of this invention, no indication of aspect ratio is shown. The practice of this invention may be, of course, employed with any desired aspect ratio.

It will be seen that in the relative position of the mask 3 with respect to the associated color filter, as illustrated in Figure 2, the complete overlap of the blue filter elements with their associated transparent sections of mask 3 is located only at substantially the center of the mask 3. In the position shown, there is no complete overlap of the transparent section of the mask with the red elements of the filter, nor is there a complete overlap in the position shown in Figure 2 of the green elements of the filter with the transparent section of the mask 3. In accordance with this invention, the scanning line of the associated image pickup or image reproducing tube will be substantially the center of the mask 3. The instantaneous position of the mask 3 with respect to the filter element shown therefore corresponds to the instant at which the scanning line is substantially the middle of the blue component color image.

The relative position and tilt of the mask 3 with respect to the color filter 5 throughout the complete scanning cycle may best be illustrated by reference to the curves of Figure 3 and the group of illustrations in Figure 4 covering a complete scanning cycle and including several selected component colors.

Figure 3:
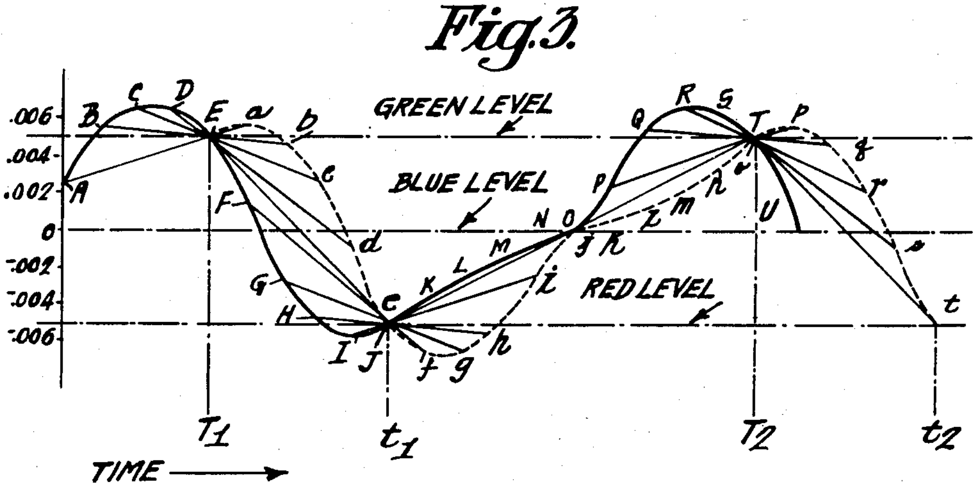
Figure 3 shows graphically, for purposes of explanation, the operation of this invention in one of its forms.

In Figure 3, a typical relative motion of the mask and filter is illustrated graphically and plotted by employing a solid line for the relative position of one end of a transparent section in the mask with respect to the associated filter elements. The relative position of the other end of the transparent section of the mask with respect to the associated filter elements is shown by the dashed line. The lines indicating green level, blue level and red level indicate the center of each color filter element. The solid lines A—*a*, B—*b*, C—*c*, etc., indicate the relative angles assumed by the transparent section of the mask at equally spaced intervals throughout a complete scanning cycle which occurs between time $T_1$ and time $T_2$, and which includes the scanning of each component color. It will be appreciated, however, that the relative angle or tilt of the lines A—*a*, B—*b*, etc., with respect to the horizontal lines representative of green level, blue level and red level, is exaggerated for the purpose of illustration. It is not intended that the practice of this invention should be limited to the relative motion shown by the curves of Figure 3. According to other forms of the invention, other shaped curves are employed.

Figure 4:
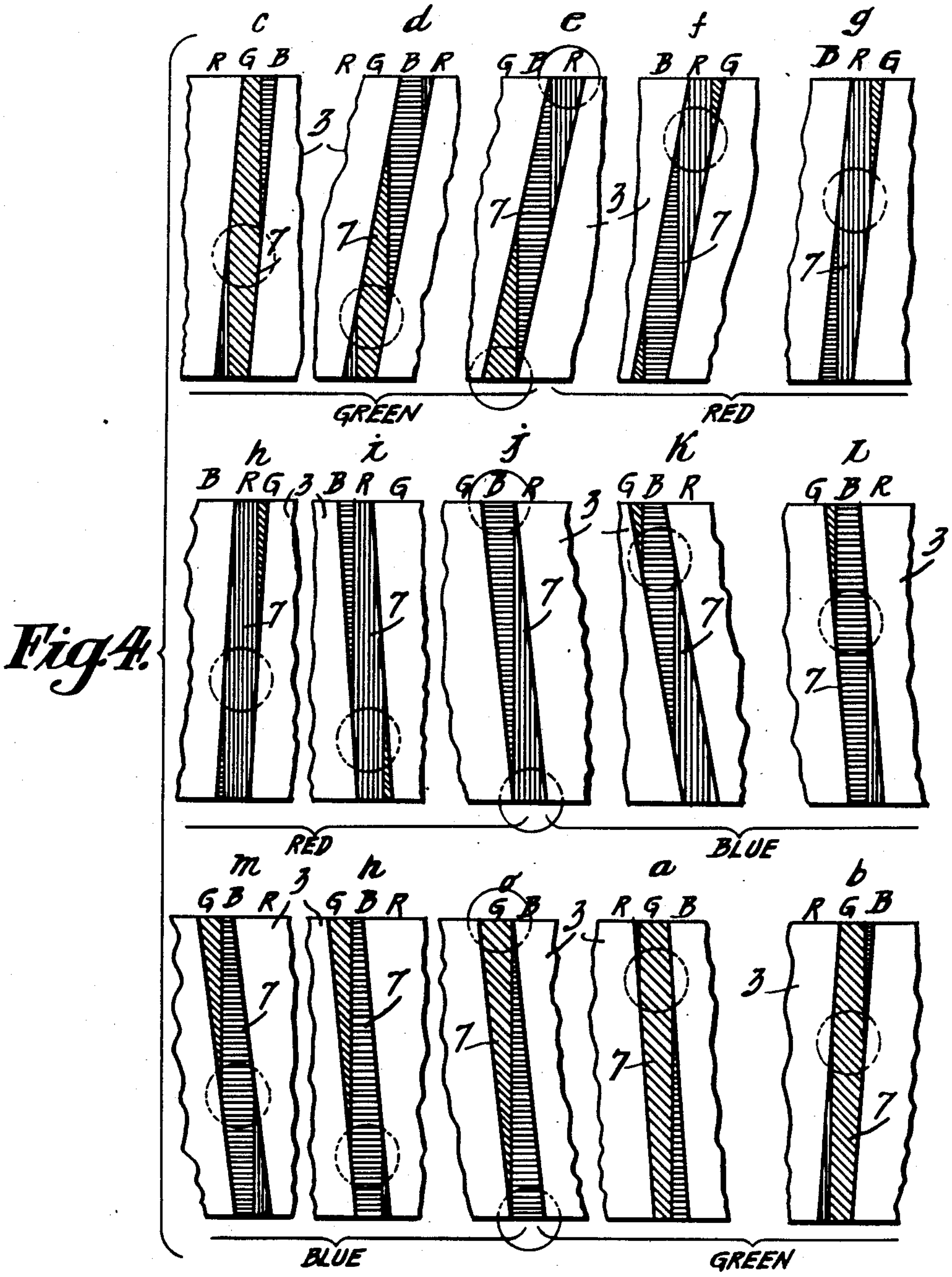
Figure 4 illustrates further by greatly enlarged view the operation of this invention throughout a total scanning operation.

By reducing the curves of Figure 3 to actual illustrations, the relative position of the transparent section of the mask with respect to its associated component color filters for each instant throughout the complete scanning cycle may be shown as illustrated in Figure 4.

In Figure 4, there is shown a number of illustrations of a greatly enlarged section of mask 3 involving a single transparent section. The tilt of the transparent section of mask 3 is illustrated, together with its relative position with respect to the associated color filter elements of color filter 5.

The illustration of a complete cycle of the multiple color scanning operation is begun for purposes of illustration at a time "*c*" corresponding to the instant at which the green component color image is being scanned at a position slightly below the center of the image. Illustration at time "*c*" in Figure 4 corresponds to C—*c* of Figure 3. The relative position of the scanning line in each of the drawings of Figure 4 is shown by a circle which is illustrative of a scanning spot. The diameter of the circle shown is not necessarily indicative of the relative size the scanning spot must take, but is suggested as one desirable size which may be employed.

It will be seen that each of the illustrations in Figure 4 employ red, green and blue as selected component colors. Any satisfactory colors may be employed and furthermore, in accordance with other forms of this invention, any number of different colors may be employed. It will also be noticed that the order of scanning of the colors has been illustrated as red, blue and green. Any order, such as green, blue and red, may be employed without departing from the spirit of this invention.

The illustrations in Figure 4 demonstrate clearly the relatively small amount of motion of the mask with respect to the color filter throughout the complete cycle of scanning. It will also be seen that between no time intervals throughout the complete scanning cycle or raster is there a rapid or jerky motion of the mask. In accordance with this invention, high acceleration is avoided by moving the top of the mask to the proper position for the transmission of the next color field, while the lower part of the mask is transmitting the lower portion of the previous color field. Furthermore, it will be observed, by an inspection of Figure 4, for example, that the rate of motion of the mask is slow as compared with the vertical scanning rate. In the particular illustration of Figure 4 wherein three sequential colors are employed, the oscillating frequency of the mask is ⅓ the vertical deflection frequency. Where $n$ colors are employed, the frequency of oscillation of the mask becomes $1/n$ the vertical deflection frequency.

Although in the form of the invention illustrated in Figure 4 the filter is stationary and the mask is moved, the mask may be stationary and the filter moved with respect thereto. In accordance with another form of the invention not illus-

SEARCH ROOM trated, both the filter and the mask may be mounted moveably and perform by relative motion with each other the series of positions illustrated in Figure 4.

Having thus described the invention, what is claimed is:

1. A light filter comprising in combination a plurality of different selected component color representative strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements representative of a single selected component color, means to move said mask and said elements with respect to each other in an oscillatory motion such that in one-half cycle of said oscillatory motion, each portion of said transparent sections traverses substantially the corresponding portions of a plurality of adjacent elements equal in number to the number of different selected component colors, and wherein the angle between the strips of said mask and the strip like elements change during operation.

2. A light filter comprising in combination $n$ different selected component color representative strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements representative of a single selected component color, means to move said mask and said elements with respect to each other in a rotational and translational oscillatory motion such that in one-$n$th cycle of said oscillatory motion, each portion of said transparent sections traverses substantially the portions of one of the plurality of adjacent elements equal in number to the number of different selected component colors, and wherein there is a different change in relative position of said mask with respect to said filter at different points on said filter.

3. A light filter comprising a plurality of different selected component color responsive strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements representative of a single selected component color, means to move said mask and said elements with respect to each other in an oscillatory motion such that in each cycle of said oscillatory motion, each portion of said transparent sections traverses substantially the corresponding portions of a plurality of adjacent of said elements equal in number to twice the number of different selected component colors, and wherein there is a different change in relative position of said mask with respect to said filter at different ends of said strip like elements.

4. A light filter comprising in combination a plurality of different selected component color representative strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements representatives of a single selected component color, means to move said mask and said elements with respect to each other in an oscillatory motion such that in each one-half cycle of said oscillatory motion, each point in said transparent sections traverses substantially the corresponding points in a plurality of adjacent of said elements equal in number to the number of different selected component colors, and wherein at least part of the time the top and the bottom of said mask will move in different directions.

5. A light filter comprising in combination a plurality of different selected component color representative strip-like elements arranged sequentially side by side and in repeating groups, a mask positioned in a plane adjacent to and parallel with the plane of said elements, said mask having transparent sections which substantially correspond optically in size, shape and spacing with the size, shape and spacing of said elements representative of a single selected component color, means to move said mask and said elements with respect to each other such that the transparent sections of said mask traverse in an oscillatory motion said elements near their extremities in their greatest dimension a greater distance than is occupied by at least one each of all the different selected component color representative elements, and wherein at least part of the time the top and the bottom of said mask will move in different directions with respect to the adjacent part of said filter.

6. A light filter comprising in combination a plurality of different selected component color representative strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements representative of a single selected component color, means to move said mask and said elements with respect to each other such that the transparent sections of said mask traverse in oscillatory motion said elements near their extremities in their greatest dimension a greater distance than is occupied by at least one each of all the different selected component color representative elements, and wherein in the horizontal movement of the top and bottom of said mask are different to result in the total overlap of the transparent sections of said mask at substantially the same point along their length with the elements of at least one selected component color at all times.

7. A color filter comprising a plurality of like size different selected component color representative strip-like elements arranged in a single plane adjacent to each other and sequentially in repeating groups, an opaque mask positioned adjacent to and parallel with the plane of said elements and having transparent sections substantially corresponding in width and separation to the width and separation of substantially all of the said elements representative of a selected component color, means to move said mask in an oscillatory motion such that in each one-half cycle of said oscillatory motion, each point in said transparent sections traverses substantially the corresponding points in a plurality of adjacent of said elements equal in number to the number of different selected component colors such that both ends of the transparent sections of said mask traverse in an oscillatory motion at least one each of said selected component color representative strip-like elements, and wherein at times during operation, the transparent sections of said mask get out of parallel with the strip like elements of said filter.

8. A scanning color filter comprising in combination a plurality of adjacently positioned rectangular color filter elements representative of different selected component colors, a grill-like mask positioned adjacent to and parallel with said elements, said mask having transparent sections which substantially correspond in size, shape and spacing with the size, shape and spacing of said elements representative of a single selected component color, means to move said elements in an oscillatory motion such that in each one-half cycle of said oscillatory motion, each point in said transparent sections traverses substantially the corresponding points in a plurality of adjacent of said elements equal in number to the number of different selected component colors, and wherein the angle will change between any given line fixed in each of said mask and filter.

9. A color filter arrangement for producing different selected component color images in sequence comprising a plurality of adjacently positioned rectangular color filter elements representative of different selected component colors arranged sequentially side by side and in repeating groups, a mask positioned in a plane adjacent to and parallel with the plane of said elements, said mask having transparent sections which substantially correspond in size, shape and spacing with the size, shape and spacing of said elements representative of a single selected component color, means to move said mask and said elements with respect to each other such that the transparent sections of said mask traverse in oscillatory motion said elements near their extremities in their greatest dimension a greater distance than is occupied by at least one each of all the different selected component color representative elements, and wherein the angle between the strips of said mask and the strip like elements change during operation to result in the total overlap of the transparent sections of said mask at substantially the same point along their length with the elements of at least one selected component color at all times, said point along the length of said transparent sections corresponding to the instantaneous location of the scanning line.

10. A plurality of different selected component color representative strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements representative of a single selected component color, and means to move said mask and said elements with respect to each other such that the full width of each transparent section of the mask repeatedly traverses substantially the full length of each different selected component color strip-like element in the group of elements associated with the transparent section and wherein the angle will change between any given line fixed in each of said mask and filter.

11. Three different selected component color representative strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements, and means to move said mask and said elements with respect to each other such that the full width of each transparent section of the mask repeatedly in synchronism with said scanning traverses substantially the full length of each different selected component color strip-like element in the group of elements associated with the transparent section only at the position of the said scanning line and wherein at times during operation, the transparent sections of said mask get out of parallel with the strip like elements of said filter.

12. A plurality of red, blue and green component color representative strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements, means to move said mask and said elements with respect to each other such that the full width of each transparent section of the mask repeatedly and in synchronism with said scanning traverses substantially the full length of each component color strip-like element in the groups of elements associated with the transparent section and in a manner such that the full width of the top of each transparent section is substantially in registry with the top of one color representative element while the bottom of the color representative element immediately preceding it in the scanning operation is being scanned and wherein the horizontal movement of the top and bottom of said mask are different.

13. A plurality of different selected component color representative strip-like elements arranged sequentially side by side and in repeating groups, a mask positioned in a plane adjacent to and parallel with the plane of said elements, said mask having transparent sections which substantially correspond in size, shape and spacing with the size, shape and spacing of said elements representative of a single selected component color, means to move said mask and said elements with respect to each other such that each color representative strip is traversed from top to bottom by the full width of the transparent sections of the mask together with the position of the designated component color scanning line and wherein at least part of the time the top and the bottom of said mask will move in different directions with respect to the adjacent part of said filter.

ALDA V. BEDFORD.

REFERENCES CITED

The following references are of record in the file of this patent:

UNITED STATES PATENTS

| Number | Name | Date |
|---|---|---|
| 2,296,908 | Crosby | Sept. 29, 1942 |
| 2,310,863 | Leverenz | Feb. 9, 1943 |
| 2,319,805 | Dyer | May 25, 1943 |
| 2,335,864 | Lang | Dec. 7, 1943 |
| 2,389,979 | Huffnagle | Nov. 27, 1945 |
| 2,452,293 | De Forest | Oct. 26, 1948 |
| 2,457,415 | Sziklai | Dec. 28, 1948 |

FOREIGN PATENTS

| Number | Country | Date |
|---|---|---|
| 589,345 | Great Britain | June 18, 1947 |